United States Patent
Wu et al.

(10) Patent No.: US 6,614,934 B1
(45) Date of Patent: Sep. 2, 2003

(54) METHOD AND APPARATUS FOR CONCATENATING BITS OF ODD-LENGTH WORDS

(75) Inventors: Tony H. Wu, Milpitas, CA (US); Ren-Yuh Wang, Cupertino, CA (US)

(73) Assignee: Divio, Inc., Sunnyvale, CA (US)

( * ) Notice: Subject to any disclaimer, the term of this patent is extended or adjusted under 35 U.S.C. 154(b) by 0 days.

(21) Appl. No.: 09/536,252

(22) Filed: Mar. 27, 2000

Related U.S. Application Data

(63) Continuation-in-part of application No. 09/431,006, filed on Nov. 1, 1999, now abandoned, which is a continuation of application No. 09/263,588, filed on Mar. 5, 1999, now Pat. No. 6,512,852.
(60) Provisional application No. 60/077,295, filed on Mar. 6, 1998, and provisional application No. 60/077,191, filed on Mar. 6, 1998.

(51) Int. Cl.[7] .................................................. G06K 9/36
(52) U.S. Cl. ...................................................... 382/232
(58) Field of Search ................................ 382/232, 236, 382/238, 240, 242, 248, 250; 358/432, 433; 348/384.1, 394.1, 395.1, 400.1–404.1, 407.1–416.1, 420.1, 421.1, 425.2, 430.1–431.1; 325/240.23, 240.24; 360/48

(56) References Cited

U.S. PATENT DOCUMENTS

| | | | |
|---|---|---|---|
| 5,359,468 A * | 10/1994 | Rhodes et al. | 360/48 |
| 5,521,940 A * | 5/1996 | Lane et al. | 375/240 |
| 5,600,812 A * | 2/1997 | Park | 395/410 |
| 5,652,889 A | 7/1997 | Sites | |
| 5,657,454 A * | 8/1997 | Benbassat et al. | 375/242 |
| 5,668,598 A * | 9/1997 | Linzer et al. | 348/402 |
| 5,675,332 A * | 10/1997 | Limberg | 341/67 |
| 5,703,907 A * | 12/1997 | James | 375/240 |
| 5,767,912 A * | 6/1998 | Bunting et al. | 348/426 |
| 5,784,110 A * | 7/1998 | Acampora et al. | 348/423 |
| 5,806,081 A | 9/1998 | Swen et al. | |
| 5,886,989 A * | 3/1999 | Evans et al. | 370/347 |
| 6,104,755 A | 8/2000 | Ohara | |
| 6,111,916 A | 8/2000 | Tallluri et al. | |
| 6,128,338 A * | 10/2000 | Behaghel et al. | 375/240 |
| 6,167,551 A | 12/2000 | Nguyen et al. | |
| 6,181,742 B1 * | 1/2001 | Rajagopalan et al. | 375/240 |
| 6,219,457 B1 * | 4/2001 | Potu | 382/246 |

* cited by examiner

*Primary Examiner*—Jose L. Couso
(74) *Attorney, Agent, or Firm*—Townsend and Townsend and Crew LLP

(57) ABSTRACT

A method and apparatus for concatenating data words from a bitstream includes a scratch memory (802, 902) containing last words of unfinished blocks and left-aligned extra data words of finished blocks. A previous register (808, 908) holds one last word of an unfinished block. A next register (806, 906) holds a first of possibly many extra data words associated with the last word. A bit detector (810, 910), coupled to the previous register (808, 908) and the next register (806, 906), first concatenates the last word and the first extra data word and identifies selected bits for the detection of a valid code word. When no more valid code words can be found from the selected bits, and more data associated with the unfinished block exists, the first extra data word is moved to the previous register (808, 908) and a second extra data word is moved to the next register (806, 906). The first extra data word and the second extra data word are concatenated for the detection of another valid code word. In various embodiments of the present invention, a start bit register (814, 914) and a remaining bits register (816) hold values that are used in concatenation and the detection of valid code words.

4 Claims, 5 Drawing Sheets

METHOD AND APPARATUS FOR CONCATENATING BITS OF ODD-LENGTH WORDS

CROSS-REFERENCES TO RELATED APPLICATIONS

This application claims priority from continuation-in-part U.S. patent application Ser. No. 09/431,006, filed Nov. 1, 1999 abandoned, which claims priority from continuation U.S. patent application Ser. No. 09/263,588, filed Mar. 5, 1999, now U.S. Pat. No. 6,512,852, which claims priority from U.S. Provisional Patent Application Nos. 60/077,295 and 60/077,191, both filed Mar. 6, 1998, all of which are incorporated herein by reference in their entireties for all purposes.

FIELD OF THE INVENTION

The present invention relates to the field of image processing. More specifically, the present invention relates to encoding and decoding digital video data.

BACKGROUND

The Digital Video (DV) format is quickly becoming the standard for many digital video applications, including consumer electronic video devices. For example, DV format camcorders can now be found with more frequency and at more competitive prices than the conventional analog 8 mm and VHS camcorders. At the same time, DV camcorders provide advantages which are inherent to digital technology, such as high quality of video and sound, digital filtering, digital error correction, and the like. DV provides quality at or higher than the high-end of the conventional analog camcorders such as Hi-8 mm and S-VHS, with much added flexibility. Also, digital format data can be repeatedly copied without loss of quality.

Digital video applications generally involve first encoding and then decoding video data. Encoded digital video constitutes a very long sequential combination, or bitstream, of zeroes and ones. The bitstream is stored for later processing, including ultimate decoding. To store the bitstream, data in sets of 16 bits are commonly packed as words. Decoding such words can be an involved process raising many challenges. One challenge in standard digital video applications is to decode efficiently and accurately. Efficient and accurate decoding, however, can be difficult to implement because the data is stored as words during the encoding process in a way that distorts the original sequence of the data.

Recursive operations in the decoding process are often complicated by such distortion. Recursive operations are generally characterized by subsequent results depending on earlier results. In the context of digital video applications, recursive operations often entail decoding data on a word-by-word basis to detect valid code words. That is, a first code word is decoded, and the start and the end of the first code word is identified. Based on the end of the first code word, the start of a second valid code word is identified. The second code word is then decoded, and the end of the second word is identified. The process repeats, continuing for subsequent code words.

The data in standard DV applications is stored according to conventions that often require separation of the bits that constitute a code word. Accordingly, the ability to detect a code word by identifying the start and end of the code word is often unduly complex. Because of the recursive nature of decoding, problems associated with decoding a particular code word apply not only to that code word, but also for all subsequent code words in the bitstream. Such problems can render parallel decoding execution infeasible. Additionally, circuits for implementing a parallel decoding scheme can suffer from excessive gate counts.

What is therefore required is decoding methods and apparatus that provides fast and efficient concatenation of bits to form code words. The implementation of such a method and apparatus should support the concatenation of words having bits that are not easily identified or properly justified, on a word-to-word basis. Preferably, the implementation should also be relatively small in required size when implemented in an integrated circuit. Finally, the implementation should provide an acceptable level of computational accuracy and, consequently, image quality.

SUMMARY OF THE INVENTION

The present invention solves the problems associated with the prior art by providing methods and apparatus for efficiently and accurately concatenating odd-length words.

In accordance with one of many aspects of the present invention, a start bit value and a remaining bit value are initialized. Selected bits from a first concatenation of words are identified based on the start bit value and the remaining bit value. Detection of a first valid code word having a first code word length is attempted from the selected bits.

In accordance with other aspects of the present invention, the start bit value and the remaining bit value are altered based on the first code word length if the first valid code word is detected.

In accordance with further aspects of the present invention, a first word and a second word are combined in the first concatenation. The second word is sequentially associated with the first word in a bitstream.

In accordance with still other aspects of the present invention, the first word is from an unfinished block. The second word is from a finished block.

In accordance with still further aspects of the present invention, the first word is stored in a scratch memory. The second word is stored in the scratch memory.

In accordance with still other aspects of the present invention, the second word is aligned in the scratch memory.

In accordance with still further aspects of the present invention, a second concatenation involving a third word is performed. The third word is sequentially associated with the second word in the bitstream.

In accordance with still other aspects of the present invention, a memory includes finished blocks and unfinished blocks. If data corresponding to a block can be stored entirely in the block, the block is referred to as a "finished block". If the data for a block exceeds the capacity of the block so that the data cannot be stored entirely in the block, the block is referred to as an "unfinished block". A first word and a second word, either from a finished block or an unfinished block, are sequentially associated. The first word and the second word are concatenated. A start bit value and a remaining bit value are initialized and used to detect a valid code word in the concatenation. If a valid code word is detected, the start bit value and the remaining bit value are altered by the length of the valid code word. The valid code word in the concatenation is discarded. Detection of another valid code word is attempted using the starting bit value and the remaining bit value as altered. If no valid code word is found, another word from the memory is concatenated with the remaining portion of the earlier concatenation and detection of another valid code word is attempted. This process repeats until all desired valid code words are detected.

These and other embodiments of the present invention, as well as its advantages and features, are described in more detail in conjunction with the text below and attached figures.

DESCRIPTION OF THE SPECIFIC EMBODIMENTS

The method and apparatus for concatenating bits of odd-length words in accordance with the present invention involves decoding of compressed data after the process of video encoding and packing the compressed data. The present invention is suitable for widely-used image compression standards that integrate various algorithms into a compression system, such as the standards specified in the Digital Video Standard (the "Blue Book" or DV standard), by the Joint Photographic Experts Group (the JPEG standard), and by the Motion Picture Experts Group (the MPEG standard).

Figure 1:
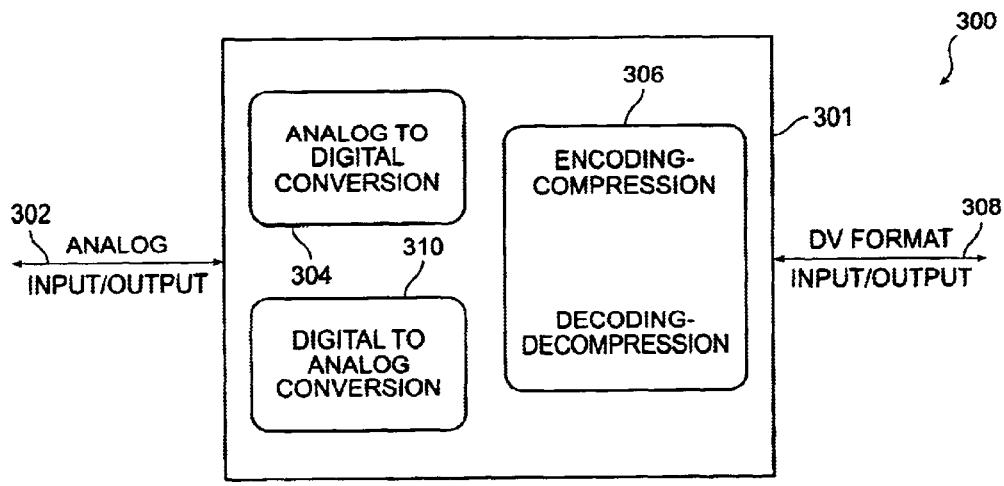
FIG. 1 illustrates a simplified block diagram of a system in accordance with the present invention.

FIG. 1 illustrates a simplified block diagram of a system 300 in accordance with the present invention. Block 301 converts analog data into DV format data, and vice versa. Analog data is input and output at an analog node 302. DV data is input and output at a DV node 308. The analog signals can include those for cable TV, analog camcorders, video cassette recorders, and other analog sources. The DV format data can include those for digital DV camcorders, digital video editors, other DV format equipment, and other forms of storage such as memory in a PC, set atop boxes, WebTV®, and the like.

When converting analog data to DV format, an A/D converter 304 converts the analog data received at the analog node 302 to digital data. The digital data from the A/D converter 304 is then input into a coding-compression block 306 for encoding and/or compression. The encoded/compressed data is then output at the DV node 308 in DV format.

When converting DV format data to analog data, DV format data is input into block 301 at the DV node 308. The DV format data is then decoded and/or decompressed by the coding-compression block 306. The decoded/decompressed data is then received by D/A converter 310 which converts the digital data to analog and then outputs the analog data at the analog node 302. Alternatively, blocks 304 and 310 can be implemented on the same chip or on two separate chips.

Figure 2:
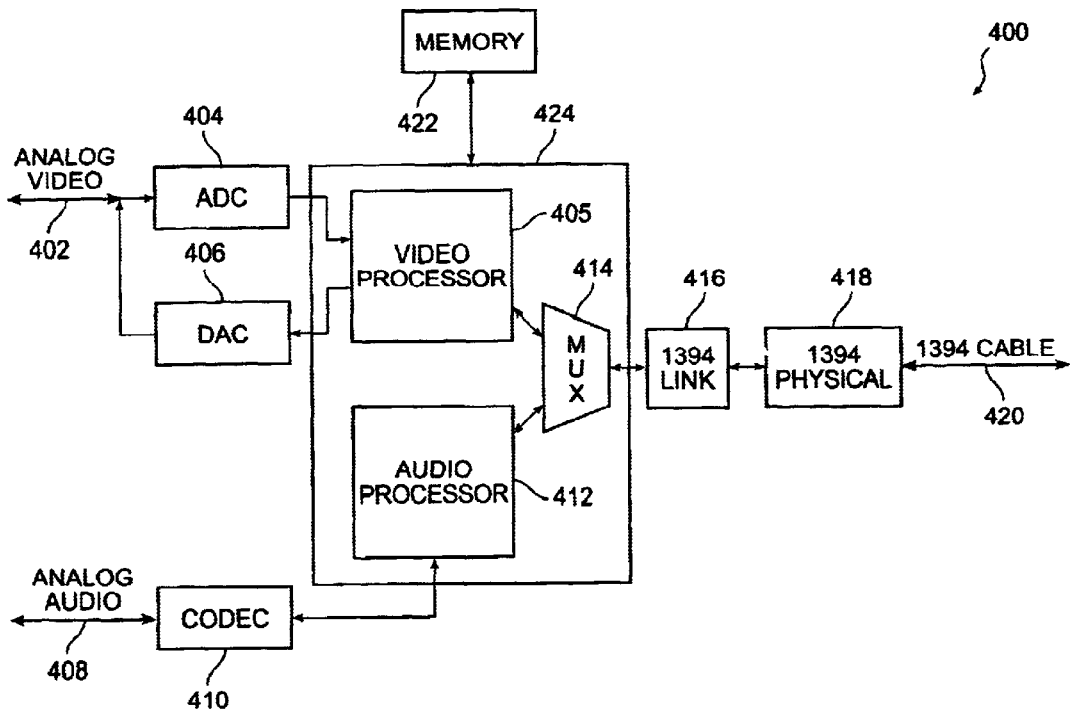
FIG. 2 illustrates a more detailed illustration of the system illustrated in FIG. 1.

FIG. 2 illustrates a system 400. The system 400 is a more detailed illustration of block 301 of FIG. 1. Analog video data is received at analog video node 402. The received data is then provided to an A/D converter 404 which converts the analog video data into a digital format. The digitized data from the A/D converter 404 is provided to a video processor 405 which performs video processing on the digitized video data. When outputting analog video data at the analog video node 402, a D/A converter 406 converts the digital analog video data from the video processor 405 into analog video data.

Audio data is received in analog format at an analog audio node 408. The analog audio data is provided to an audio converter 410. The audio converter 410 can convert analog audio data into digital format and vice versa. The audio converter 410 can be a Philips Electronics® UDA1344 or other suitable audio converter chips. The audio converter 410 is coupled to an audio processor 412. The audio processor 412 processes digital audio signals. The audio processor 412 can be any suitable audio processing chip such as digital signal processor (DSP) chips available from Texas Instruments®. A multiplexer 414 multiplexes data from/to the video processor 405 and the audio processor 412. The multiplexer 414 is coupled to a link chip 416. The link chip 416 is preferably a purely digital chip and provides a link layer for communication in accordance with 1394 standard originally designed by Apple Computer, Inc.® Currently, the 1394 standard can provide a bandwidth of 100 Mb/sec, 200, 400, or 800 Mb/sec. Other brands of link chips can also be used such as Texas Instruments® TSB12LV42 and Phillips Electronics® PDI1394L21. The link chip 416 is coupled to physical layer 418 which provides a connection in accordance with the 1394 standard. The physical layer 418 is coupled to a cable 420 which is also designed in accordance with standard 1394. The cable 420 can also be an optical cable.

FIG. 2 also illustrates a memory 422 which can be any type of storage such as dynamic random access memory (DRAM), extended output DRAM (EDO DRAM), synchronous DRAM (SDRAM), video RAM (VRAM), static RAM (SRAM), and the like. The memory 422 provides storage for devices within system 400 including storage for functions performed within block 424, such as functions performed by the video processor 405 and the audio processor 412. Additionally, some elements of the system 400 can have their own local memory.

Figure 3:
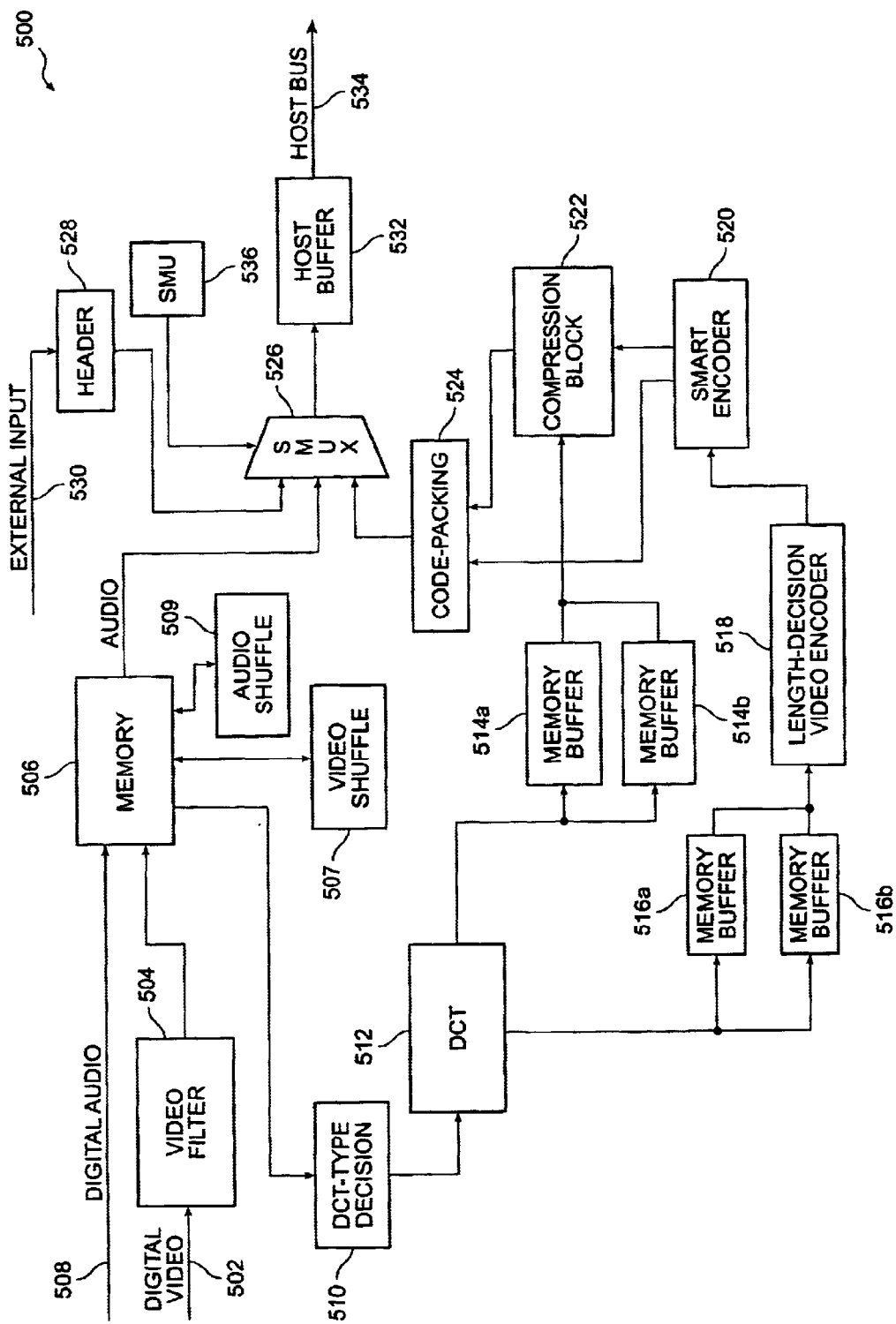
FIG. 3 illustrates a detailed block diagram of a coding-compression block illustrated in FIG. 1.

FIG. 3 illustrates a system 500. The system 500 is a more detailed block diagram of the coding-compression block 306 of FIG. 1. Digital video data is received at a video node 502. The received digital video data is preferably in 4:2:2 format, indicating four bytes of data for luminance (Y), two bytes of data for chrominance red (CR) and two bytes of data for chrominance blue (CB), respectively. The digital video data can be provided by any video decoder chip, such as Phillips Electronics® SAA7112. A video filter 504 performs filtering operations on the digital video data received at the video node 502. The filtering operations can include filtering for NTSC or PAL television system standards. For example, for NTSC the 4:2:2 format data can be filtered into 4:1:1 format. For PAL, the 4:2:2 format data can be filtered into 4:2:0 format data. Other filtering operations by the video filter 504 can include horizontal and vertical filtering to remove noise. The filtered video data from the video filter 504 can be stored in a memory 506. The video data can be arranged by a video shuffle block 507 to store the video data more efficiently in the memory 506. The memory 506 can also store digital audio data received at an audio node 508. An audio shuffle block 509 can arrange the audio data more efficiently in the memory 506. The memory 506 can be any type of storage such as DRAM, EDO DRAM, SDRAM, VRAM, SRAM, and the like. The memory 506 provides storage for devices within the system 500. Additionally, some elements of the system 500 can have their own local memory.

The video data stored in memory 506 can be retrieved by DCT-type decision block 510 (where DCT is discrete cosine transform). The DCT-type decision block 510 can determine whether 8×8 or 2×4×8 type DCT should be performed on the retrieved video data. The retrieved video data is then provided to a DCT block 512 which is configured to perform the discrete cosine transformation on the retrieved data. The DCT block 512 will perform the DCT operation on the retrieved data in accordance with the DCT-type decision made by the DCT-decision block 510. The transformed data from the DCT block 512 is stored in memory buffers 514a–b and 516a–b. The memory buffers 514a–b can be identical. Similarly, the memory buffers 516a–b can be identical. The memory buffers 514a–b preferably store 1 k×20 bits of data. Memory buffers 516a–b preferably store 64×10 bits of data. Such a configuration will allow storage of one video segment in each of the memory buffers 514a–b. As detailed above, each video segment includes five (5) macro blocks and each macro block includes six (6) blocks of 8×8 pixels. Also, such a configuration will permit the memory buffers 516a–b to each store one 8×8 block of DCT transformed data. The memory buffers 514a–b and 516a–b will act as back and forth memory buffers, i.e., each time one memory buffer is filled, incoming data will be stored in the other memory buffer. Similarly, when data is read from one memory, the other memory buffer is being filled. For example, with respect to the memory buffers 516a–b, if the 0th 8×8 block is stored in the memory buffer 516a, the 1st block of the 8×8 block data is stored in the memory buffer 516b. Similarly, the 2nd 8×8 block is stored in the memory buffer 516a and the 3rd 8×8 block of data is stored in the memory buffer 516b. The 8×8 blocks stored in the memory buffers 516a–b are input into a length-decision video encoder 518. The length-decision video encoder 518 receives the frequency-domain pixel information transformed by the DCT block 512.

In contrast with other types of compression techniques, DV video encoding incorporates a few dynamically adjusted parameters to help maintain the video compression ratio at around 5:1. These parameters include the DCT-type (8×8 or 2×4×8), class number (0, 1, 2, and 3), Quantization or Q factor (0–15), and limited selection of quantization factor (powers of 2, simplifying implementation). These parameters are related to both the spatial-domain information (before DCT) and the frequency-domain information (after DCT). The almost constant compression ratio requirement can be maintained by determining the appropriate compression factors before any actual compression is performed. For example, the length-decision video encoder 518 determines the length information necessary for variable length coding (VLC).

There are sixteen possible Q factors (also know as "Q-numbers"). The length-decision video encoder 518 determines the length information for the received data from the memory buffers 516a–b based on five out of the sixteen possible Q factors. The reason for choosing only five of the sixteen possible Q-numbers is to reduce the number of computations and comparisons. The length-decision video encoder 518 computes the length for each of the Q-numbers, which is then used to look up an encoded length from an encoding table. Preferably, the five Q-numbers used are 0, 3, 7, 11, and 15 to provide a more dynamic range of values.

After the length decision, the data is input to a smart encoder 520. The smart encoder 520 determines which Q factors would provide the best compression based on the length decision for each block of 8×8 data. The selected Q-numbers are provided to compression block 522 for application to video segments stored in the memory buffers 514a–b. The compression block 522 can also include a code-decision video encoder for variable length coding. The smart encoder 520 can also provide information to a code packing block 524. Such information can, for example, include length information, selected Q-numbers, class numbers, DCT-type, and the like. The length information includes data about length of data stored in each macro block. The code packing block 524 receives the compressed data from compression block 522 and the macro block length information from smart encoder 520. The code packing block 524 arranges video data efficiently into a bitstream. The code packing block 524 is coupled to a system multiplexer 526. The system multiplexer 526 also receives audio data from the memory 506 and header information from a header block 528. The audio information can be from the audio node 508, and other sources of audio, such as audio overlays, editors, and the like. The header information can be input from outside the system. For example, external information such as close captioning, Tele-text, or different language subtitles, can be received from an external input 530.

The system multiplexer 526 arranges the outgoing data based on timing considerations to recreate real-time data in an appropriate order. The output of the system multiplexer 526 is coupled to a host buffer 532. The host buffer 532 is coupled to a host bus 534. The host buffer 532 ensures that data is buffered before it is provided to the host bus 534. Such a configuration will, for example, ensure that data will not be lost if the host bus is busy. The code packing block 524 can be coupled to the system multiplexer 526 through a pair of memory buffers similar to the memory buffers 514a–b (not shown). Such memory buffers would have a similar configuration, i.e., one would be read from while another is receiving data. The size of these memory buffers is preferably 385 bytes each. The system multiplexer unit 536 will provide control data to the system multiplexer 526 based on timing considerations to recreate real-time data flow in an appropriate order. Accordingly, the digital audio data received on the audio node 508 and the digital video data received on the video node 502 will be converted to DV format data by system 500 and output at node 534.

Figure 4:
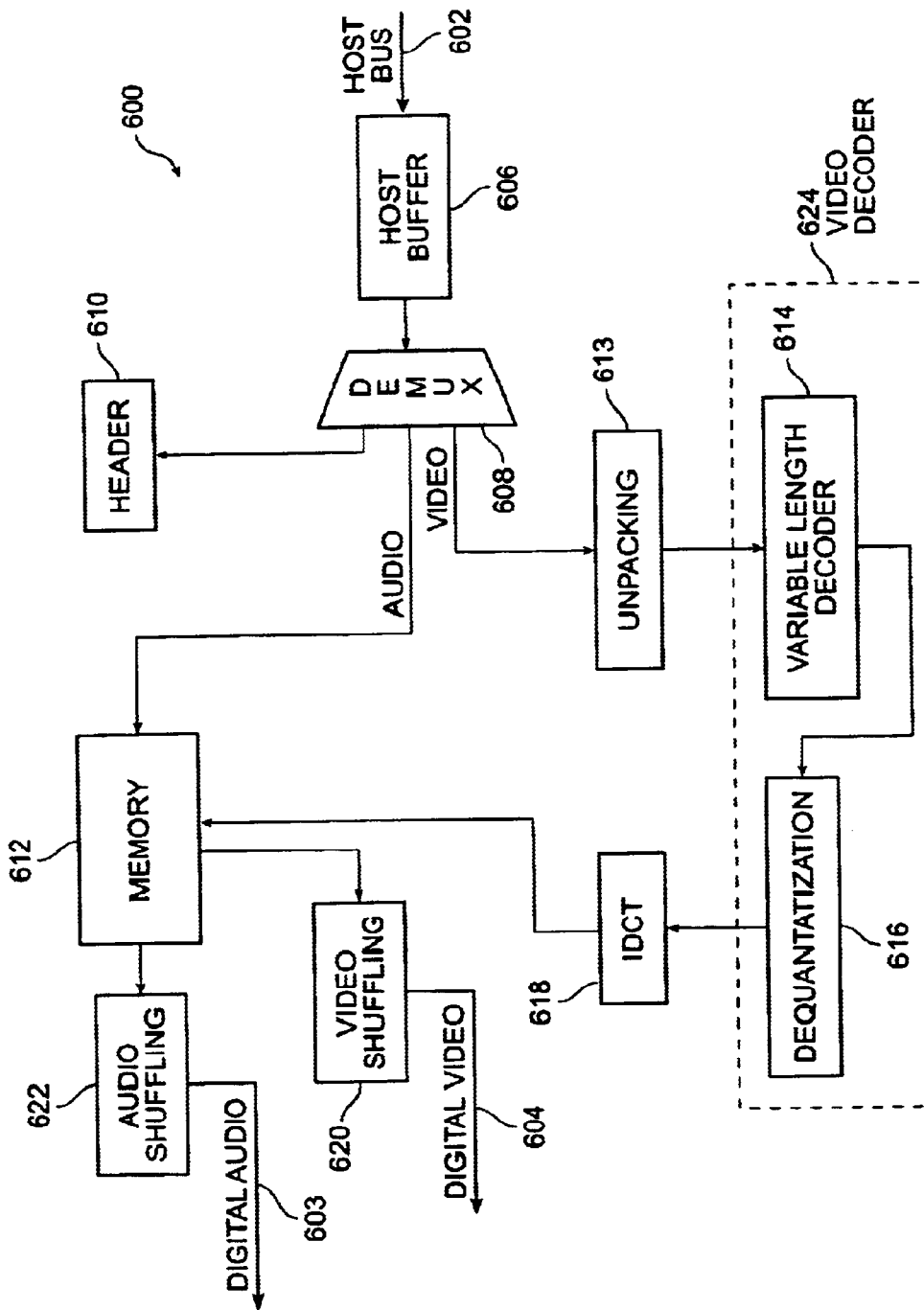
FIG. 4 illustrates a simplified block diagram of a system for converting DV data to digital data.

FIG. 4 illustrates a simplified block diagram of a system 600 for converting DV data received at a host node 602 to digital audio and video data which are respectively output at a digital audio node 603 and a digital video node 604. The DV data from the host node 602 is received by a host buffer 606. The host buffer 606 buffers the DV format data and provides the data to a demultiplexer 608. The demultiplexer 608 demultiplexes the DV data received from the host buffer 606 and provides header data to a header block 610, audio data to a memory 612, and video data to an unpacking block 613. The header data can be information such as close captioning, Tele-text, different language subtitles, and other data embedded in the DV format data. The memory 612 can be any type of storage such as DRAM, EDO DRAM, SDRAM, VRAM, SRAM, and the like. The memory 612 can also provide storage for devices within the system 600. Moreover, some elements of the system 600 can have their own local memory.

The unpacking block 613 is configured to convert the bitstream data to bitstreams for each video block and provide these unpacked blocks of data to a video decoder 624. The video decoder 624 receives 16 bit data and decodes the bitstream into individual pixel values. The video decoder 624 includes a variable length decoder 614 and a dequantization block 616. The variable length decoder 614 decodes the DV video data in accordance with variable length decoding techniques. The output of variable length decoder 614 is coupled to the dequantization block 616 which dequantizes the DV bitstream in accordance with embedded dequantization factors. The dequantization block 616 is coupled to an inverse DCT (IDCT) block 618 which is configured to perform inverse discrete cosine transformation on the dequantized bitstream. The IDCT operation converts data from the frequency domain to the spatial domain. In an alternative embodiment of the present invention, two memory buffers (not shown) can be coupled between the dequantization block 616 and the IDCT block 618. In such an embodiment, the memory buffers are RAMs, each having a storage capacity of 1 k×20. The spatial domain video data is then stored in the memory 612. A video shuffling block 620 retrieves the stored video data from the memory 612 and arranges the video data in an appropriate order if necessary. The video shuffling block 620 can also perform operations such as interpolation and filtering on the retrieved video data. For example, the video shuffling block 620 can perform a seven-tap horizontal filter which would convert a 4:1:1 format video data to a 4:2:2 format video data. Also, a three-tap vertical filter can be performed by the video shuffling block 620 to convert video data from 4:2:0 to 4:2:2 format. The output of the video shuffling block 620 can then be converted to analog format. At this stage, a chip such as Phillips Electronics® SAA7121 can be used to perform the conversion operations.

Similarly, an audio shuffling block 622 retrieves the stored audio data from the memory 612 and arranges the audio data in an appropriate order if necessary. The audio shuffling block 622 can also perform operations such as interpolation and filtering on the retrieved audio data. The output of the audio shuffling block 622 can then be converted to analog format. At this stage, a chip such as Phillips Electronics® UDA1344 can be used to perform the conversion operations.

Figure 5:
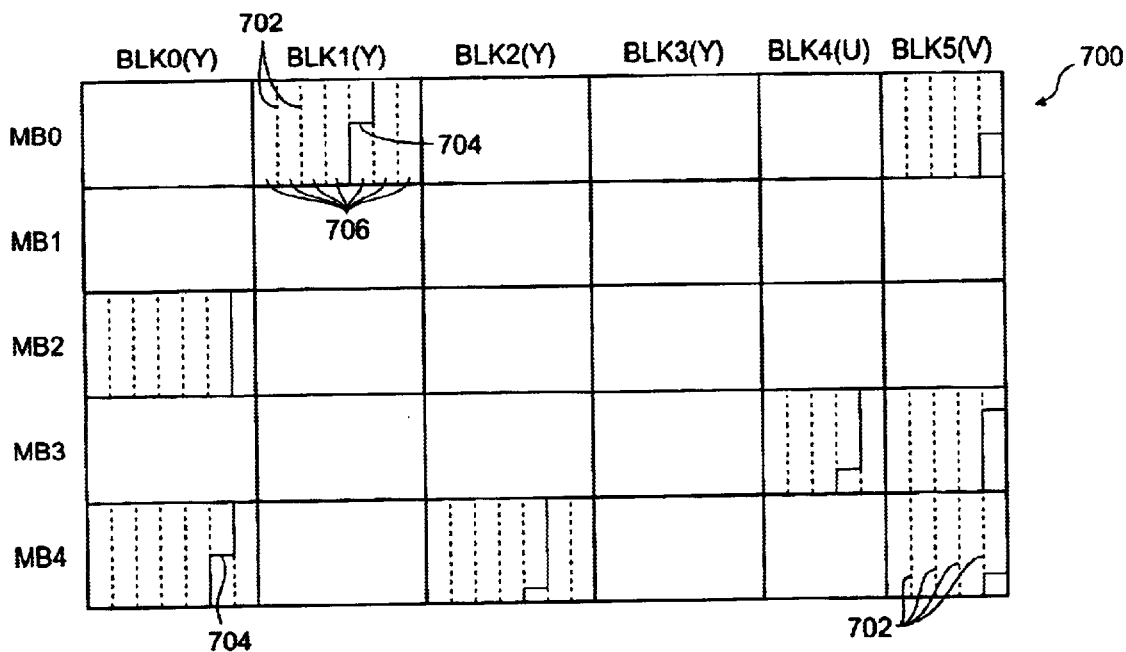
FIG. 5 illustrates a video segment after encoding and packing.

In one embodiment, the methods and apparatus for concatenating bits of odd-length words, in accordance with the present invention, involves decoding of compressed data after the process of video encoding and packing the compressed data. FIG. 5 is a representation of an illustrative video segment 700 after video encoding and packing of a digital video bitstream. The video segment 700 contains five macro blocks designated MB0, MB1, MB2, MB3, and MB4. Each macro block contains six blocks designated BLK0(Y), BLK1(Y), BLK2(Y), BLK3(Y), BLK4(U), and BLK5(V). In total, the video segment 700 contains 30 blocks. Each of the blocks BLK0(Y), BLK1(Y), BLK2(Y), BLK3(Y) has a capacity of 2×7 bytes. Each of the blocks BLK4(U) and BLK5(V) has a capacity of 2×5 bytes. One with ordinary skill in the art would appreciate that the blocks could have other capacities.

Under the DV standard, video encoding and packing includes three passes, as described in more detail by the Blue Book. The three passes are commonly referred to as "pass one", "pass two", and "pass three". Pass one involves placing the data into blocks, one block at a time. During pass one, if the data corresponding to each block can be stored entirely in the block, the block is referred to as a "finished block". Finished blocks are represented in the video segment 700 by a lack of shading. For example, block BLK1(Y) of macro block MB0, a finished block, contains data that is entirely contained in the block BLK1(Y). The data in block BLK1(Y) is separated into words 706 of 16 bits each. Each word 706 is separated by parallel vertical lines 702. Data in the words are placed in the blocks in sequential order. A solid horizontal line 704, and other horizontal lines in other finished blocks of the video segment 700, is an end of block (EOB) token. Preferably, the EOB token is four predetermined bits. The EOB token of a finished block is a demarcation between data corresponding to the block and data corresponding to other blocks or portions of the block that do not contain data, as described in more detail below in connection with pass two and pass three.

During pass one, if the data for each block exceeds the capacity of the block so that the data cannot be stored entirely in the block, the block is referred to as an "unfinished block". Unfinished blocks are represented in the video segment 700 by shading. For example, block BLK0(Y) is an unfinished block that contains extra data that cannot be stored entirely in the block.

During pass two, extra data for all unfinished blocks are placed in other finished blocks having capacity in the same macro block. Pass two proceeds one macro block at a time. For example, as discussed above, extra data corresponding to block BLK0(Y) of macro block MB0 could not be entirely stored in that block. The extra data is placed after the EOB token 704 of block BLK1(Y) of macro block MB0. If the extra data corresponding to block BLK0(Y) can be contained entirely in block BLK1(Y), then the extra data is placed there with a following EOB token. Any remaining capacity in block BLK1(Y) can be used for extra data corresponding to any other unfinished blocks in macro block MB0. If the extra data corresponding to block BLK0(Y) can not be contained entirely in block BLK1(Y), then the extra data will be contained after the EOB token of block BLK5 (V). Similarly, the extra data corresponding to the other unfinished blocks of macro block MB0 will be placed in the finished blocks of macro block MB0 if they have capacity.

During pass three, any extra data of unfinished blocks of a macro block that could not be placed in finished blocks of the same macro block are placed into finished blocks of other macro blocks that have capacity. For example, assume that the extra data of block BLK0(Y) is placed after the EOB token of block BLK1(Y) of macro block MB0. Assume further that the extra data can not be entirely contained in block BLK1(Y). Accordingly, the extra data that could not be contained in block BLK1(Y) would be placed after the EOB token of block BLK5(V). Assume further that the extra data could not be contained entirely block BLK5(V). In that case, during pass three, the extra data that could not be stored in blocks BLK1(Y) and BLK5(V) is placed in another finished block of macro blocks MB1, MB2, MB3, MB4 that has capacity after pass one and pass two, as described above.

Figure 6:
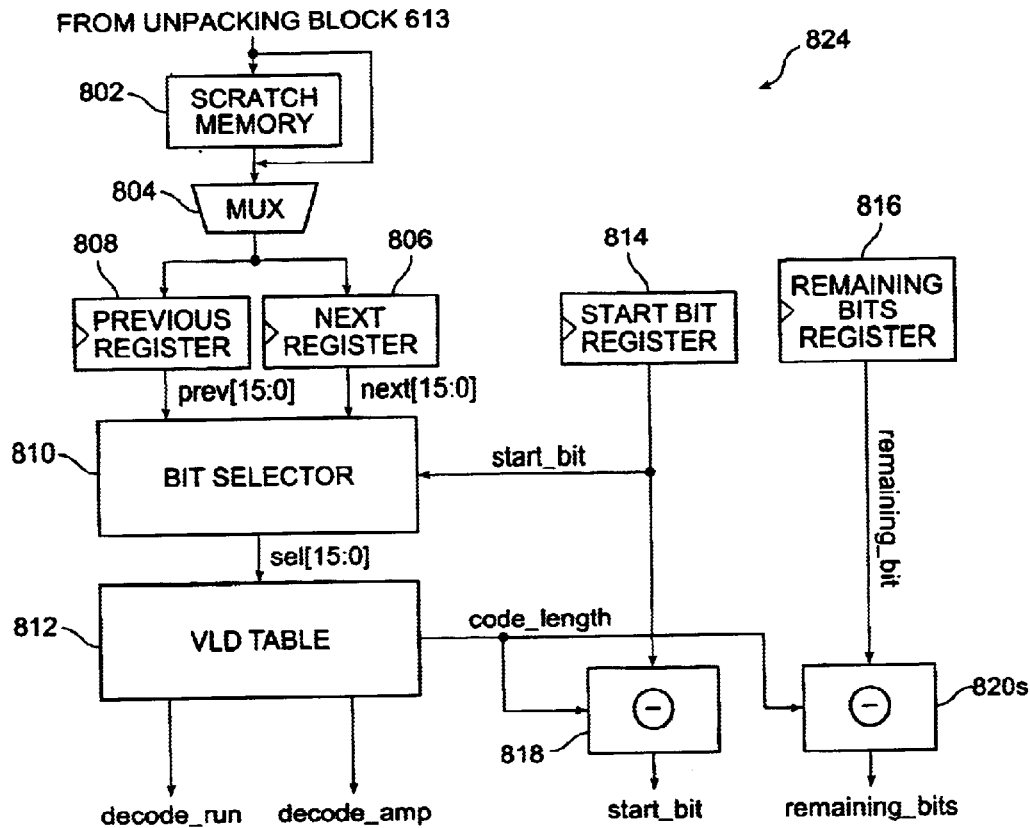
FIG. 6 illustrates a detailed block diagram of a first embodiment of a video decoder illustrated in FIG. 4.

After encoding and packing in the manner described above, the data stored in the video segment 700 can also be decoded in three passes. FIG. 6 illustrates a video decoder 824. The video decoder 824 is a functional block diagram of a preferred embodiment of the video decoder 624 that pertains to the decoding process in accordance with one embodiment of the present invention. The dequantization block 616 of FIG. 4 is not shown in FIG. 6. The video decoder 824 includes a scratch memory 802, a multiplexer (MUX) 804, a next register 806, a previous register 808, a bit selector 810, a Variable Length Decoding (VLD) table 812, a start bit register 814, a remaining bits register 816, a subtractor 818, and a subtractor 820.

General decoding in accordance with the present invention will now be discussed. The unpacking block 613 provides a first word, designated prev[15:0], of a particular block to the MUX 804. The first word prev[15:0] is provided to the previous register 808. The first word prev[15:0] is then provided to the bit selector 810.

A start_bit is stored in the start bit register 814. Initially, the value of the start_bit is 31. Initially, the start_bit value of 31 corresponds to the most significant bit of the first word prev[15:0]. The value of the start_bit is stored in the start bit register 814 and provided to the bit selector 810. The bit selector 810 serves to concatenate the word from the previous register 808 and the word from the next register 806. Preferably, the bit selector 810 is implemented using random logic with an extended selection range having a 48 bit input. Beginning from the value of the start_bit, the bit selector 810 selects 16 selected bits, designated sel[15:0], from the data provided to the bit selector 810. The selected bits sel[15:0] are identified from the most significant bit (MSB) to the least significant bit (LSB) of the input to the bit selector 810.

The selected bits sel[15:0] are provided from the bit selector 810 to the VLD table 812. The VLD table 812 is used to detect a valid code word in the selected bits sel[15:0]. If a valid code word is detected, a run coefficient, designated decode_run, and an amplitude coefficient, designated decode_amp, are provided to the IDCT block 618 to obtain reconstructed video data. In alternative embodiment, the run coefficient decode_run and the amplitude coefficient decode_amp are first provided to the memory buffers, as discussed above, before being provided to the IDCT block 618. The. subtractor 818 decreases the start_bit value of 31 by the length of the detected code word, designated $code_{13}$ length.

A remaining_bits is stored in the remaining bits register 816. The value of the remaining_bits is the number of bits provided in the previous register 808 and the next register 806 including the start_bit and following bits. Initially, the value of the remaining_bits is 16 because only the first word prev[15:0] has been provided to the previous register 808. No word has been provided to the next register 806, and then the bit selector 810, yet. The subtractor 820 decreases the remaining_bits value of 16 by the length of the detected code word code_length.

The start_bit value is provided to the bit selector 810. From the start_bit value, the bit selector 810 attempts to detect a valid code word for the bits remaining in the first word prev[15:0]. If no valid code word is detected, then a second word is provided to the next register 806. The second word, designated next[15:0], is the next sequence of bits following the bits in the first word prev[15:0]. The second word next[15:0] is provided to the bit selector 810. From the start_bit value, the bit selector 810 selects 16 bits from the combination of the first word prev[15:0] and the second word next[15:0] and discards the bits having values greater than the start_bit value. The bits are discarded because they have already been decoded. By discarding such bits, the bit selector 810 performs a left alignment of the bitstream. The 16 selected bits sel[15:0] are then provided to the VLD table 812 to detect a valid code word from the selected bits sel[15:0] in the manner described above.

If a valid code word is detected, the subtractor 818 decreases the start_bit value by the length of the code word code_length, as discussed above. The subtractor 820 decreases the remaining_bits value by the length of the code word code_length, as discussed above. The detection of valid code words continues from the start_bit value. If start_bit value is 15 or less, the start_bit value falls within the range of the bits of the second word next[15:0]. In that case, the bits in the previous register 808 are discarded, and the bits in the next register 806 are provided to the previous register 808. A third word is provided to the next register 806. As a result, the start_bit value will increase by 16 and the remaining_bits value will increase by 16. Decoding continues by providing new words to the next register 806 and the bit selector 810 in the general manner described above until an EOB token is encountered.

Decoding in accordance with the method and apparatus for concatenating bits of odd-length words of the present invention will now be specifically described. During pass one, the video decoder 824 will process a maximum of seven 16 bit words for blocks BLK0(Y), BLK1(Y), BLK2(Y), BLK3(Y) and a maximum of five 16 bit words for blocks BLK4(U), BLK5(V) for each macro block of the video segment 700 shown in FIG. 5. Words of each block are sequentially provided to the previous register 808 and the next register 806 in the general manner described above. As stated above, the decoding process will continue until an EOB token is found for a particular finished block. When an EOB token is found for a finished block, the word having extra data corresponding to another block is identified. This extra data word contains the EOB token.

As discussed above in connection with encoding and packing, the extra data was first placed in other finished blocks having capacity of a common macro block during pass two and later placed in any other finished blocks having remaining capacity during pass three. The extra data could be an entire 16 bit word. More likely, however, the extra data is a partial word. The extra data word is left-aligned by the scratch memory 802 by discarding the data corresponding to the block from which the last word came. The discarded data is all bits before the EOB token and the EOB token itself. The left-aligned extra data word is all bits after the EOB token in the word. The left-aligned extra data word, the start_bit value, remaining_bits value, Q-number, DCT type, and class number are stored in the scratch memory 802. In the preferred embodiment, the start_bit value is five bits; remaining_bits value is five bits; the Q-number is four bits; the DCT type is one bit; and, the class number is one bit. The number of bits for each stored value could of course vary. Similarly, the type of information stored could vary.

The scratch memory 802 preferably has a storage capacity of 30×33 bits. Each of the 30 arrays in the scratch memory corresponds to one of the 30 blocks of the video segment 700. Of course, other kinds and capacities of scratch memories can be implemented in accordance with the present invention. In the preferred embodiment, the scratch memory 802 of the video decoder 624 can be shared with an associated encoder. The scratch memory 802 can be any type of storage device such as dynamic random access memory (DRAM), extended output DRAM (EDO DRAM), synchronous DRAM (SDRAM), video RAM (VRAM), static RAM (SRAM), and the like.

For an unfinished block, the last word in the previous register 808, the start_bit value, the remaining_bits value, Q-number, DCT type, and class number are stored in the scratch memory 802. The last word is the last 16 bit word of the block being decoded. Only the extra data words of finished blocks and the last words of unfinished blocks are provided to and stored in the scratch memory 802. All other words are provided directly from the unpacking block 613 to the MUX 804. Decoding of unfinished blocks, which do not contain EOB tokens, continue in pass two and pass three.

During pass two, the last word of an unfinished block is provided from the scratch memory 802 to the previous register 808 through the MUX 804. The left-aligned extra data word of the finished block corresponding to the unfinished block in a common macro block is provided from the scratch memory 802 to the next register 806 through the MUX 804. The data from the previous register 808 and the next register 806 are linked together, or concatenated, and processed to detect a valid code word in the general manner described above. Additional extra data words in the same macro block as the unfinished block, which are stored in the scratch memory 802 and which correspond to the unfinished block being decoded, are sequentially provided to the next register 806 and the bit selector 810 for decoding. Pass two ends when all the data corresponding to the unfinished block has been decoded or if additional extra data words have been placed in another macro block.

During pass three, which can be partially similar to pass two, the last word of an unfinished block or the last extra data word corresponding to the unfinished block is provided from the scratch memory 802 to the previous register 808 through the MUX 804. The left-aligned extra data word corresponding to the unfinished block in a different macro block is provided from the scratch memory 802 to the next register 806 through the MUX 804. The data from the previous register 808 and the next register 806 are linked together, or concatenated, and processed to detect a valid code word in the general manner described above. Additional extra data words in macro blocks other than the macro block of the unfinished lock, which are stored in the scratch memory 802 and which correspond to the unfinished block being decoded, are sequentially provided to the next register 806 and the bit selector 810 for decoding. Pass three ends when all the data corresponding to the unfinished block has been decoded.

The video decoder 824 illustrated in FIG. 6 can accommodate words provided to previous register 808 that are 16 bits or shorter. The remaining_bits value identifies how many bits are in the word currently being decoded. The bit selector 810 can determine the length of the word by using the start_bit value and the remaining_bits value. In this way, the remaining_bits value, as calculated by the subtractor 820, allows the decoding of words having variable size. No second word need be provided to the next register 806 if the start_bit value falls into the bit range of the next register 806.

Figure 7:
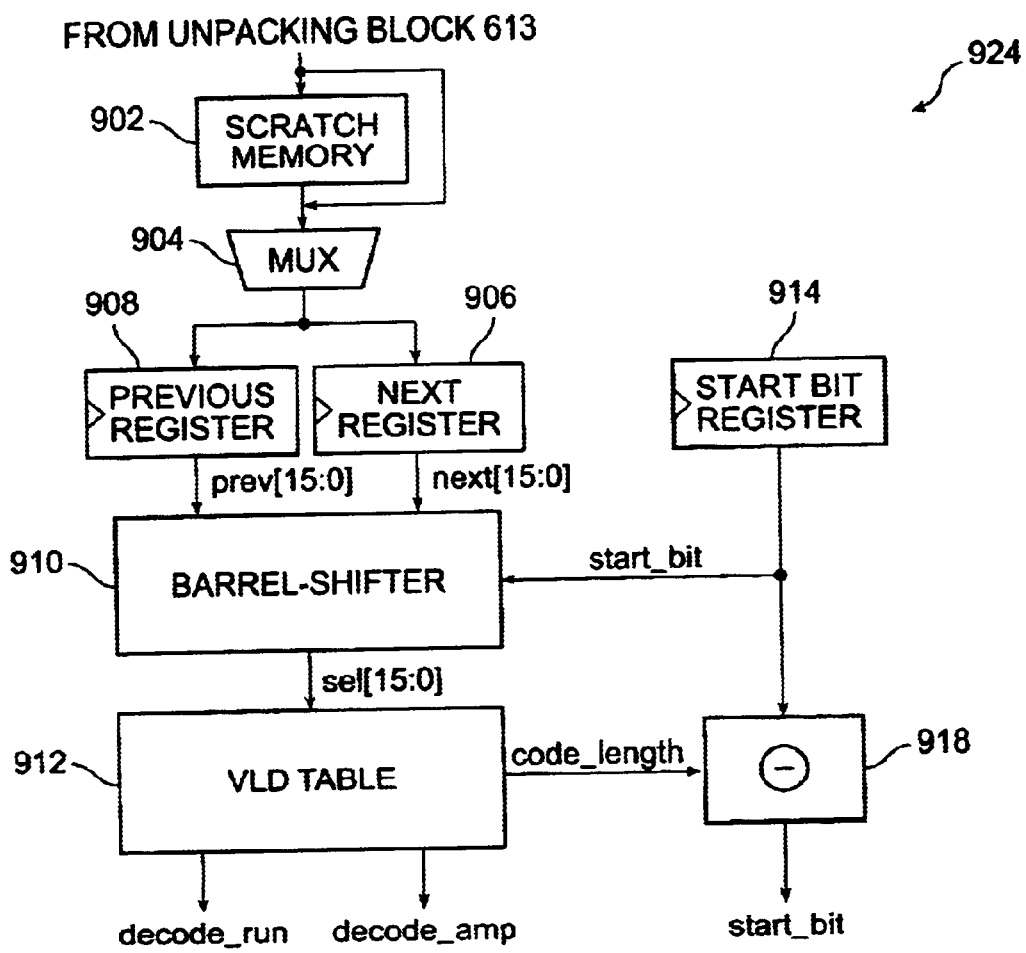
FIG. 7 illustrates a detailed block diagram of a second embodiment of the video decoder illustrated in FIG. 4.

FIG. 7 illustrates a video decoder 924. The video decoder 924 is a functional block diagram of an alternative embodiment of the video decoder 624 that pertains to the decoding process in accordance with one embodiment of the present invention. The video decoder 924 accommodates words that are exactly 16 bits. The video decoder 924 includes a scratch memory 902, a multiplexer (MUX) 904, a next register 906, a previous register 908, a barrel-shifter 910, a VLD table 912, a start bit register 914, and a subtractor 918. The scratch memory 902, the MUX 904, the next register 906, the previous register 908, the barrel-shifter 910, the VLD table 912, the start bit register 914, and the subtractor 918 function in a manner similar to their analogous components of the video decoder 824 in FIG. 6. For the video decoder 924, the barrel-shifter 910 is implemented instead of the bit selector 810 of the video decoder 824. In the preferred embodiment, the barrel-shifter 910 is a 48-bit-in/16-bit-out barrel-shifter.

The video decoder 924 does not have components analogous to the remaining bits register 816 and the subtractor 820. The video decoder 924 does not calculate a remaining_bits value for a word being decoded. The video decoder 924 can not determine the length of a word being decoded based on information relating to the number of bits in a word after the start_bit value. As a result, the video decoder 924 is suited to decoding words having a constant bit length.

The techniques of the present invention are therefore readily implemented in an integrated circuit to allow the efficient compression and decompression of digitally encoded images, while consuming a minimal amount of integrated circuit area. The techniques of the present invention comply with the Digital Video Standard (the "Blue Book"). These techniques can also be of use in systems implementing other standards, such as the International Standards Organization's (ISO) Joint Photographic Experts Group (JPEG) standard, ISO DIS 10918-1, and is JPEG-compliant, as set forth in ISO DIS 10918-2. These standards are included by reference herein, in their entirety. Moreover, the techniques of the present invention can be understood in the framework of a JPEG image compression/decompression system, such as that outline in "JPEG Still Image Data Compression Standard" by W. B. Pennebaker and J. L. Mitchell, which is also included by reference herein, in its entirety.

As will be understood by those with ordinary skill in the art, the present invention may be embodied in other specific forms without departing from the spirit or essential characteristics thereof. For example, the techniques of the present invention can also be applied to other compression systems such as the standards specified by Motion Picture Experts Group (MPEG), or MPEGII. These standards are included by reference herein, in their entirety and for all purposes.

Alternately, the techniques of the present invention can be implemented in a computer system. For example, present invention can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Moreover, the techniques of the present invention can be implemented by utilizing the available routines and features such as caching, new instruction sets, and single instruction multiple data (SIMD) tools which are provided by Intel® Corporation's MMX™ technology, Advance Micro Device,® Inc.'s 3DNow!™ technology, and their equivalents. Additionally, even though the techniques of the present invention have been discussed with respect to DCT transformation other types of transformations can also be utilized such as wavelet transform and vector quantization (VQ). Accordingly, for an understanding of the scope of the invention, reference should be made to the appended claims.

Also, having fully described certain features of the preferred embodiments of the present invention, many other equivalent or alternative techniques of implementing bit-shuffling according to the present invention will be apparent to those with ordinary skill in the art. For example, although the bit selector 810, as discussed, performs a left alignment of the bitstream, it should be readily apparent to one of ordinary skill in the art that a right alighment of the bitstream is possible in other embodiments of the present invention when, for example, analysis of the bitstream using the previous register 808 and the next register 806 is reversed.

As another example, other signal processing applications that employ such bitstreams may benefit from the present invention. Also, the implementation shown in the figures is but one of many possible architectures which may be designed to take advantage of the method of the present invention. These equivalents and alternatives, and others, are intended to be included within the scope of the present invention. Accordingly, for an understanding of the scope of the invention, reference should be made to the appended claims.

What is claimed is:

1. A method for processing digital video data comprising:

storing a first word in an unfinished block associated with a first portion of data, the first portion not entirely contained in the unfinished block;

storing a second word in a finished block associated with a second portion of the data, the second portion entirely contained in the finished block, the second word sequentially associated with the first word and the unfinished block;

providing the first word to a first register;

providing the second word to a second register;

providing the first word and the second word to a bit selector;

performing a first concatenation of the first word and the second word;

using a start bit value to identify a corresponding bit in the first concatenation;

using a remaining bit value to determine a number of bits in the first concatenation starting from the corresponding bit;

using the start bit value and the remaining bit value to detect a first valid code word having a length;

altering the start bit value and the remaining bit value by the length of the first valid code word if the first valid code word is detected;

discarding bits of the first concatenation corresponding to the first valid code word; and using the start bit value and the remaining bit value as altered to detect a second valid code word in remaining bits of the first concatenation.

2. The method of claim 1 wherein said steps are performed sequentially.

3. The method of claim 1 further comprising performing a second concatenation of a third word and the remaining bits of the first concatenation to detect a second valid code word.

4. The method of claim 1 further comprising aligning the second word.

* * * * *